US008064595B2

United States Patent
Brown et al.

(10) Patent No.: US 8,064,595 B2
(45) Date of Patent: Nov. 22, 2011

(54) ADAPTIVE MUTE

(75) Inventors: William Brown, Santa Cruz, CA (US);
Anthony Reese, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 421 days.

(21) Appl. No.: 12/422,204

(22) Filed: Apr. 10, 2009

(65) Prior Publication Data
US 2010/0260332 A1    Oct. 14, 2010

(51) Int. Cl.
*H04M 1/00* (2006.01)
*H04M 9/00* (2006.01)
*H04M 3/42* (2006.01)

(52) U.S. Cl. ............... 379/421; 379/207.02; 379/202.01

(58) Field of Classification Search ............. 379/202.01, 379/203.01, 204.01, 205.01, 206.01, 207.02, 379/393, 421; 455/414.1, 416, 174.1
See application file for complete search history.

(56) References Cited

U.S. PATENT DOCUMENTS

| | | | |
|---|---|---|---|
| 2003/0185371 A1* | 10/2003 | Dobler | 379/207.02 |
| 2006/0098798 A1* | 5/2006 | Krasnansky | 379/202.01 |
| 2007/0037536 A1* | 2/2007 | Battaglini et al. | 455/212 |
| 2010/0067680 A1* | 3/2010 | Hanson et al. | 379/202.01 |

* cited by examiner

*Primary Examiner* — Tuan Nguyen
(74) *Attorney, Agent, or Firm* — The Intellectual Property Law Office of Thomas Chuang (57) ABSTRACT

Systems and methods for providing mute status reminders are presented. The system and method includes monitoring a mute status duration upon activation of a mute status at a communication device, outputting a periodic mute reminder having an output period responsive to activation of the mute status, and adjusting the output period responsive to the mute status duration.

25 Claims, 8 Drawing Sheets

ADAPTIVE MUTE

BACKGROUND OF THE INVENTION

Communication devices typically provide a mute status selection feature which allows a call participant to activate a mute status that prevents transmission of audio to call participants at other communication devices. For example, the call participant may activate the mute status to prevent background noise in the immediate vicinity from being transmitted. The call participant may also activate the mute status to conduct a private sidebar conversation. When the participant desires to actively communicate during the call, the mute status is deactivated using the mute selection feature.

It is not uncommon for the call participant to lose track of whether the mute status is activated or deactivated. Where the mute status is deactivated and the participant believes it is activated, the participant may inadvertently communicate irrelevant or embarrassing comments to the other call participant or participants. In the alternative situation where the mute status is activated and the participant believes it is deactivated, the participant may begin to speak and the other participants will not hear what is said. There is a delay before the participant realizes he or she is not being heard, and once the error is realized and corrected, the participant will have to repeat what was said and all participants in the call may need to backtrack the comments being discussed.

In the prior art, an audible tone repeated at a regular rate is output to the participant to indicate that he or she is muted. However, these tones are often annoying and may mask the call content with each output. For this and other reasons, improved methods and apparatuses for providing mute status reminders are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for mute status reminders are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Prior art methods of outputting audio tones to the user to indicate mute status require improvement. In particular, if the mute status has been active for an extended period, as is typical during a conference call, the repetitive tones become annoying. In one example, an improved method and apparatus is described whereby an adaptive mute feedback such as a tone or voice prompt is generated when the mute status (also referred to herein as a mute state) is initially activated. Following activation, the mute feedback repeats on a periodic basis. However, the longer the mute state is activated, the longer the duty cycle (i.e., period between tones or voice prompts) of the adaptive mute feedback becomes. For example, the initial period between tones might be every 10 seconds, with an increase to 20 seconds after 1 minute, 30 seconds after a further 2 minutes, a minute after a further 5 minutes etc., as long as the mute state remains active. Upon deactivation and re-activation of the mute status, the cycle would start once again with the initial, faster rate mute feedback period.

A user may have difficulty understanding what the various tones signify. In one configuration, to address this, upon initial mute a spoken voice cue such as 'muting' is heard just prior to the mute tone. The spoken cue is repeated on a low duty cycle (e.g., in the order of minutes as opposed to seconds, such as every 15 minutes) and not every time the tone is repeated.

In one example, to address the problem that the participant has forgotten that he is muted, the mute status feedback is immediately played back, perhaps in a more emphatic form (e.g., louder, higher pitch etc.) the moment the participant starts speaking while the mute status is active. Standard VAD (Voice Activity Detect) algorithms can be used to determine that the participant is speaking. In some cases the user mutes the communication device in order to carry on a sidebar conversation. To address this use case, immediate playback of the mute status feedback is disabled if the participant begins speaking immediately or within a short time after muting. In addition, if speech begins and continues after a period of being muted, immediate playback of the mute status feedback is provided, but is repeated on an ever longer duty cycle as the participant continues to speak.

Thus, in one example, the call participant is provided with a less annoying indication of being muted and a more immediate reminder that the participant is muted when the participant wants to speak in the call. The participant is reliably informed whether he or she is muted in a user friendly way.

In one example, a communication apparatus includes a mute activation/deactivation control user interface, a timer adapted to monitor a mute status duration upon activation of a mute status, and a mute status reminder module adapted to output a periodic mute reminder having an adjustable output period between each mute reminder. The mute status reminder module is further adapted to adjust the output period responsive to the mute status duration.

In one example, a method for providing a mute status reminder includes monitoring a mute status duration upon activation of a mute status at a communication device, outputting a repeating mute status reminder having an output period responsive to activation of the mute status, and adjusting the output period responsive to the mute status duration.

In one example, a computer readable storage medium stores instructions that when executed by a computer cause the computer to perform a method for providing a mute status reminder including monitoring a mute status duration upon activation of a mute status. The method further includes outputting a repeating mute status reminder having an output period responsive to activation of the mute status, and adjusting the output period responsive to the mute status duration.

Figure 1:
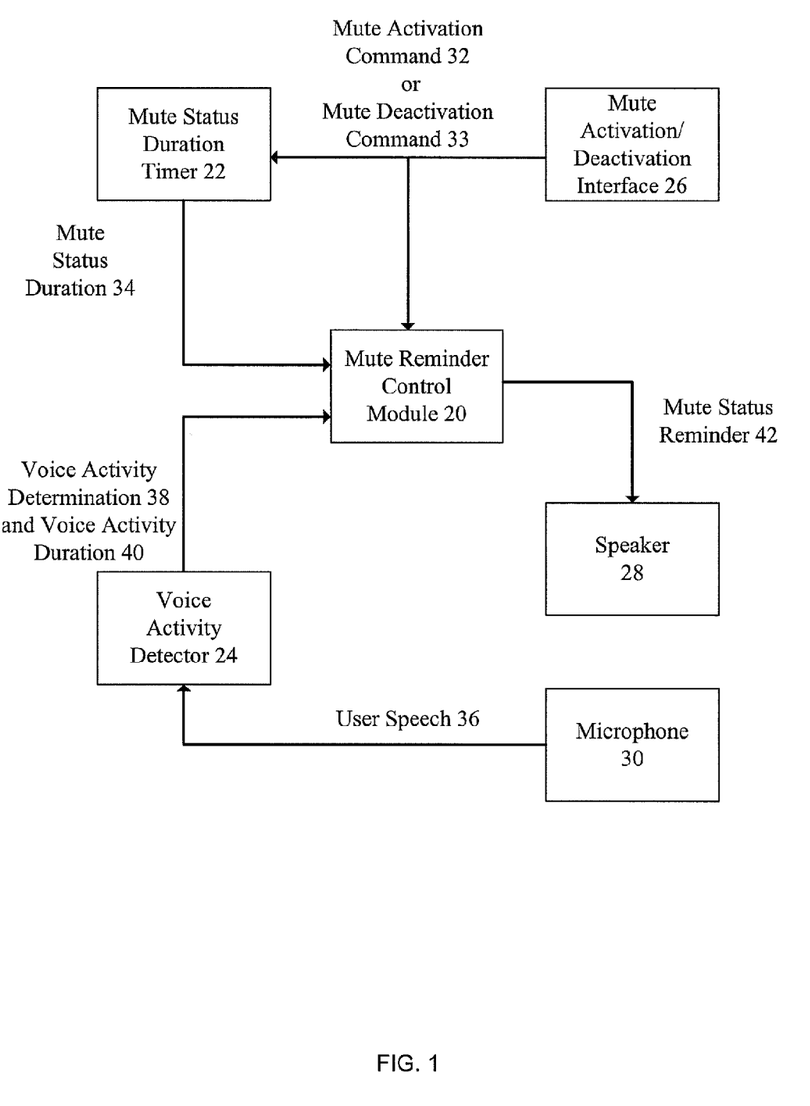
FIG. 1 illustrates a block diagram of a mute reminder apparatus in one example.

FIG. 1 illustrates a block diagram of a mute reminder apparatus in one example. The mute reminder apparatus includes a mute status reminder control module 20, mute status duration timer 22, mute activation/deactivation interface 26, voice activity detector 24, speaker 28, and microphone 30.

In operation, a mute activation command 32 or mute deactivation command 33 is sent from mute activation/deactivation interface 26 upon selection by a user. The mute activation command 32 or mute deactivation command 33 is sent to both mute status duration timer 22 and mute status reminder control module 20. Mute status duration timer 22 is adapted to monitor a mute status duration 34 upon activation of a mute status and receipt of a mute activation command 32. Mute status duration timer 22 outputs the mute status duration 34 to mute status reminder control module 20.

Mute status reminder control module 20 is adapted to output a periodic mute reminder 42 having an adjustable output period between each individual mute reminder. The periodic mute reminder 42 is output to speaker 28. The mute status reminder control module 20 is further adapted to adjust the output period responsive to the mute status duration 34. In one example, the output period is increased as a function of increasing mute status duration 34.

In one example, the periodic mute reminder 42 having an adjustable output period includes both an audible tone and a spoken word. In one configuration, the audible tone is repeated at a first period between each audible tone and the spoken word is repeated at a second period between each spoken word, where the first period is less than the second period. In one example, the periodic mute reminder 42 is a visual indicator output at a visual interface such as a light emitting diode (LED).

Voice activity detector 24 detects any user speech 36 received at microphone 30. Voice activity detector 24 outputs a voice activity determination 38 and a voice activity duration 40 to mute status reminder control module 20 based on the detected user speech 36.

In one configuration, the mute status reminder control module 20 is adapted to immediately output a mute reminder 42 optionally having a modified characteristic upon detecting the presence of user speech 36 subsequent to activation of the mute status. For example, the modified characteristic may be a mute reminder 42 having an increased volume level or altered pitch. In a further example, the mute status reminder control module 20 determines an elapsed time between activation of the mute status and detection of voice activity. The mute status reminder control module 20 is adapted to pause or cancel the periodic mute reminder 42 if the elapsed time is less than a pre-determined elapsed time.

In one example, the voice activity detector 24 detects a period of ongoing voice activity subsequent to activation of mute status. During the period of ongoing voice activity, the output period or mute reminder 42 is adjusted.

Figure 2:
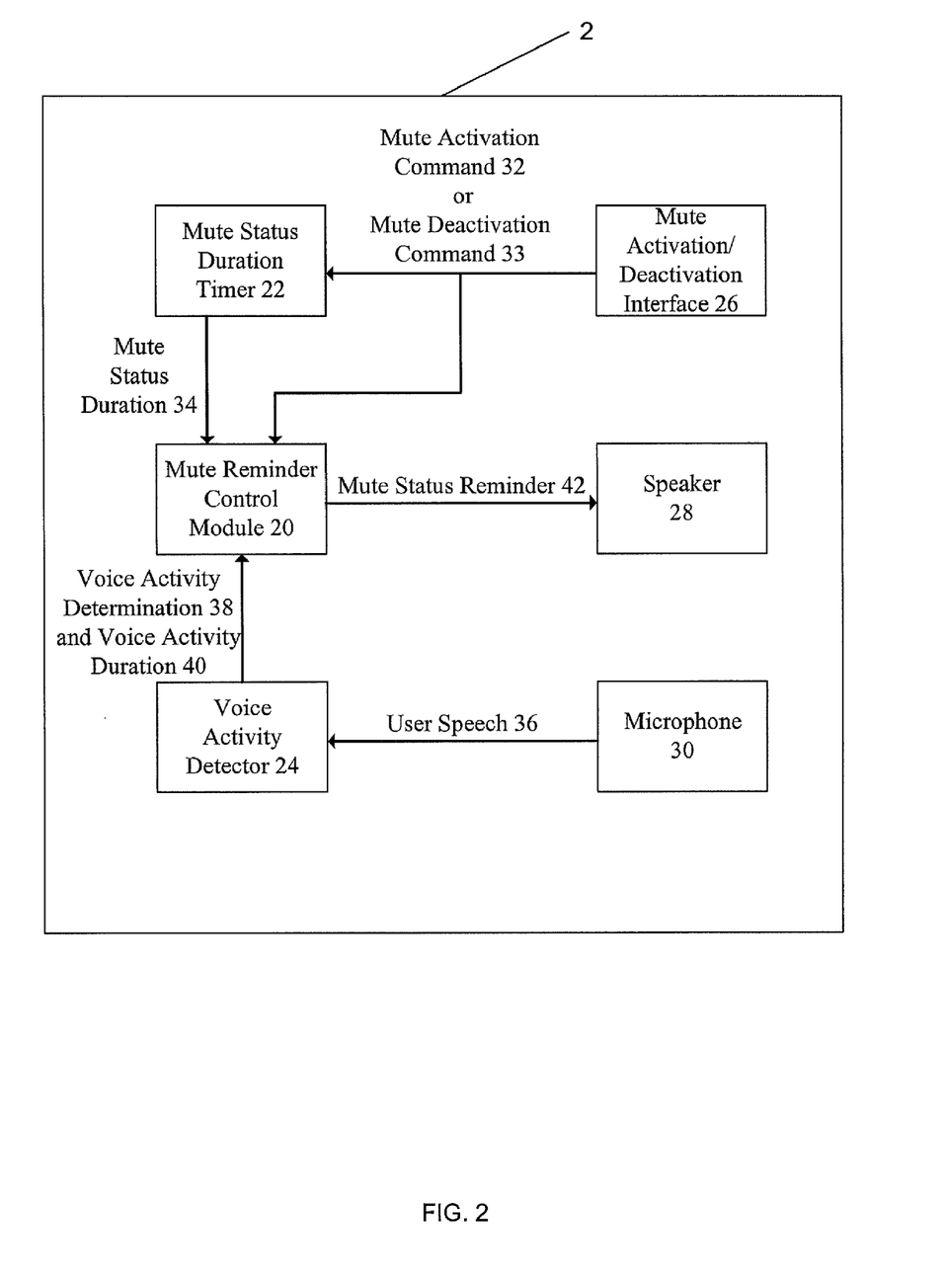
FIG. 2 illustrates a communications device employing the reminder apparatus shown in FIG. 1.

The blocks of the mute status reminder apparatus illustrated in FIG. 1 can be contained within a single communication device or distributed between multiple devices. FIG. 2 illustrates a communication device 2 employing the mute status reminder apparatus shown in FIG. 1. Communication device 2 may also include a network interface, processor, and memory operable to perform communication functions described herein. Mute activation/deactivation interface 26 may, for example, be a dedicated button where communication device 2 is a mobile phone, desk phone, or headset.

Figure 3:
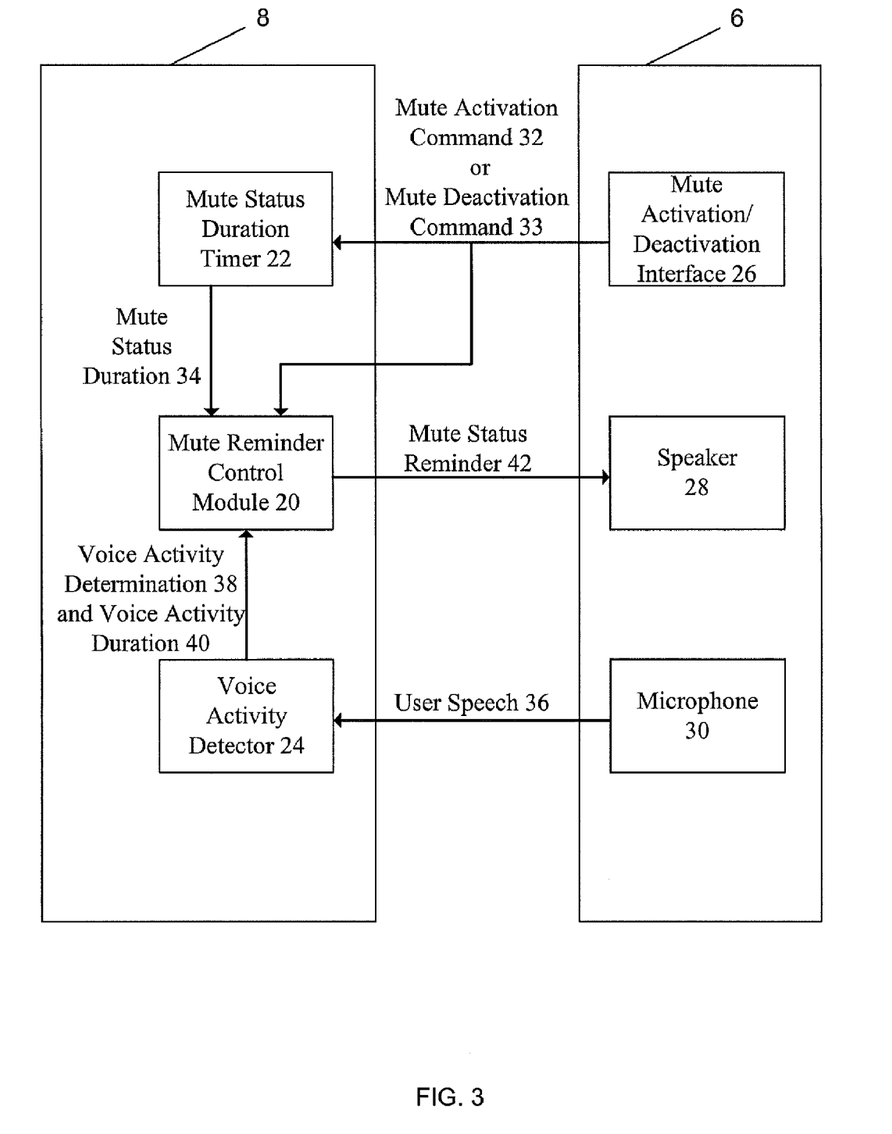
FIG. 3 illustrates the mute reminder apparatus shown in FIG. 1 distributed between two devices.

FIG. 3 illustrates the mute status reminder apparatus shown in FIG. 1 distributed between two devices, a communication device 6 and a telephone conference bridge 8. In the example shown in FIG. 3, the telephone conference bridge 8 includes the mute status duration timer 22, mute status reminder control module 20, and voice activity detector 24. The communication device 6 includes a mute activation/deactivation interface 26, speaker 28, and microphone 30.

Figure 4:
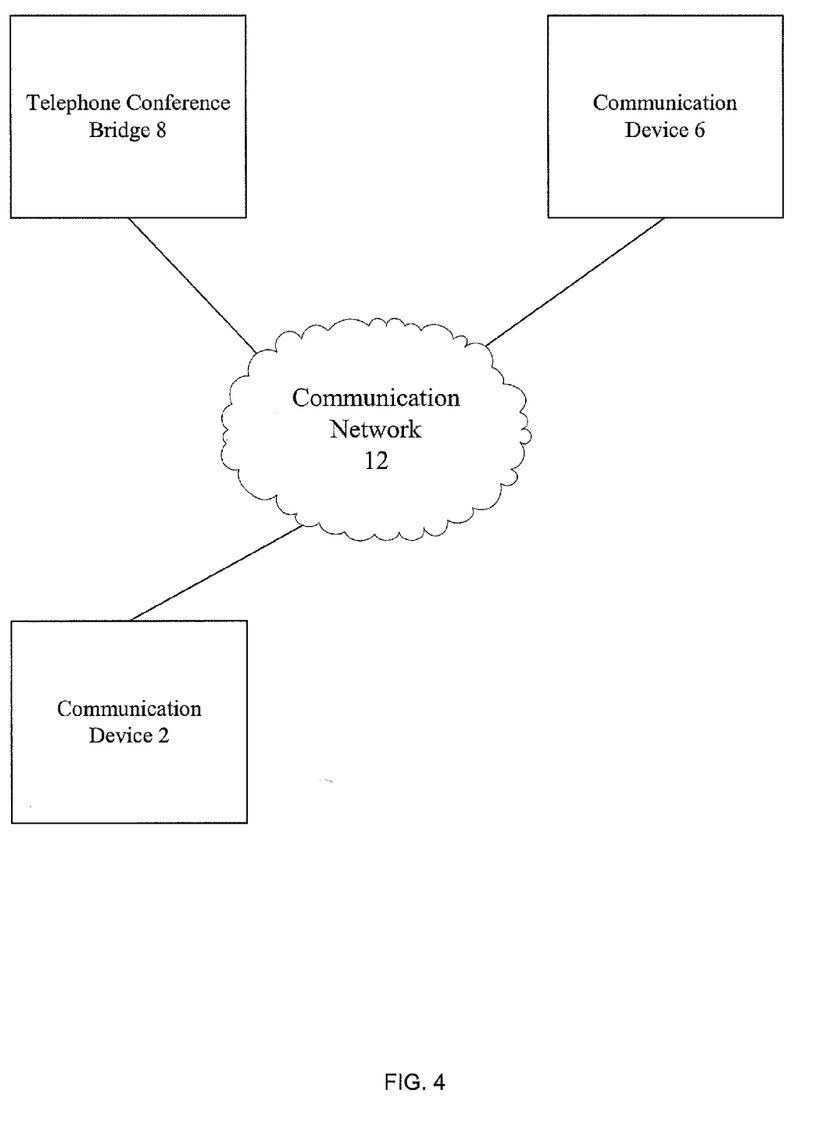
FIG. 4 illustrates a communications system for providing a mute status reminder.

FIG. 4 illustrates a communications system for providing a mute status reminder utilizing communication device 2, communication device 6, and telephone conference bridge 8 shown in FIG. 2 and FIG. 3 in one example. Communication device 2, communication device 6, and telephone conference bridge 8 connect to a communication network 12 for communications there between. Communication device 2 and communication device 6 may be any device capable of sending and receiving communications through communication network 12. For example, communication device 2 or communication device 6 may be a wireless headset, mobile smartphone, personal computer, wired or wireless telephone, speakerphone, or telephone conference bridge. In one example, communication network 12 may be any one or combination of public switched telephone networks (PSTN), cellular networks, or Internet Protocol (IP) networks.

Referring to FIG. 2 and to FIG. 4, in one usage scenario, communication is established between communication device 2 and communication device 6, and operation of the mute status reminder apparatus in communication device 2 is as described herein. Referring to FIG. 3 and FIG. 4, in one usage scenario, communication is established between communication device 6 and telephone conference bridge 8. Mute activation command 32, mute deactivation command 33, mute reminder 42 and user speech 36 are transmitted across communication network 12 between communication device 6 and telephone conference bridge 8. Operation of the mute status reminder apparatus is as described herein.

Figure 5:
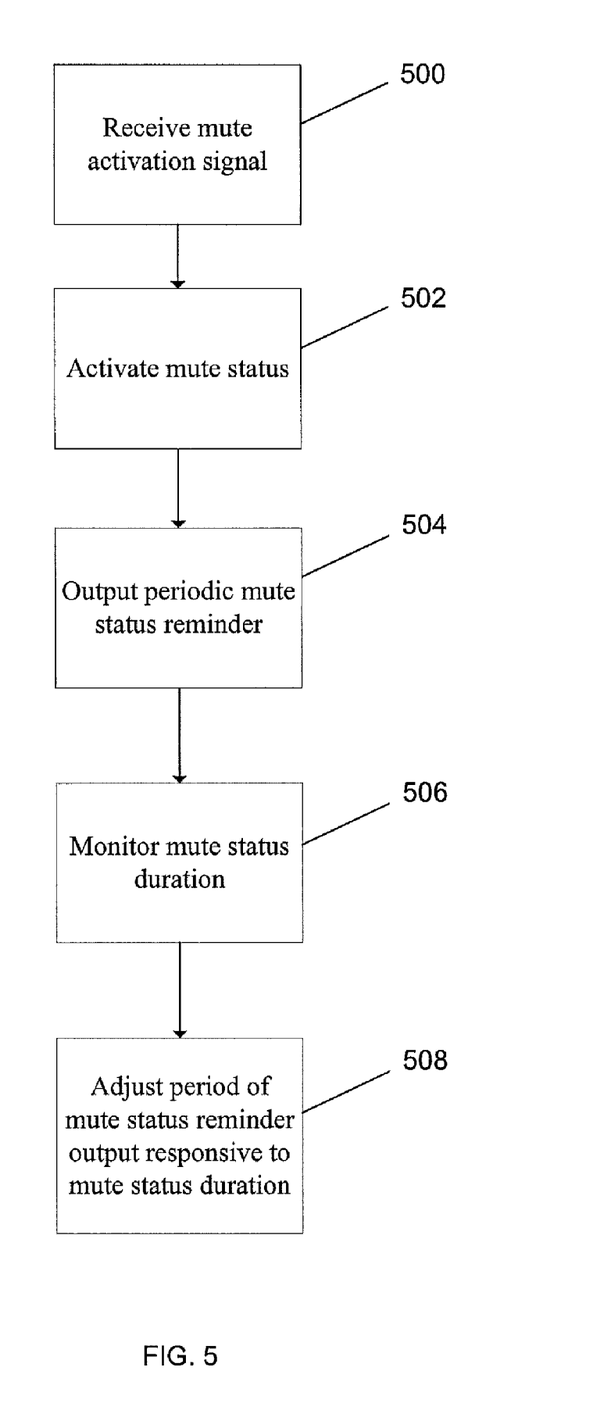
FIG. 5 is a flow diagram illustrating a process for providing a mute status reminder in one example.

FIG. 5 is a flow diagram illustrating a process for providing a mute status reminder in one example. At block 500, a mute activation signal is received. At block 502, a mute status is activated. At block 504, a periodic mute status reminder is output. At block 506, the mute status duration is monitored. At block 508, the period of the mute status reminder is adjusted responsive to the mute status duration.

Figure 6A:
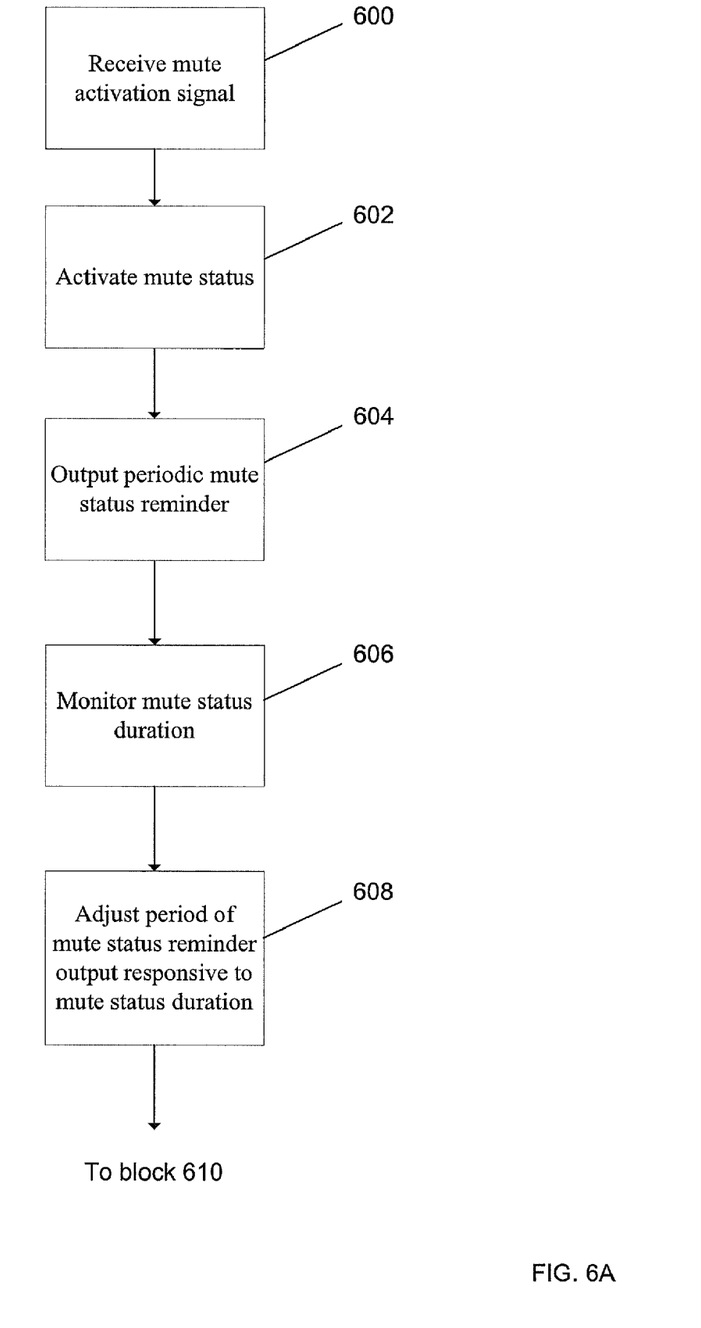
FIGS. 6A-6C are a flow diagram illustrating a process for providing a mute status reminder in a further example.
Figure 6B:
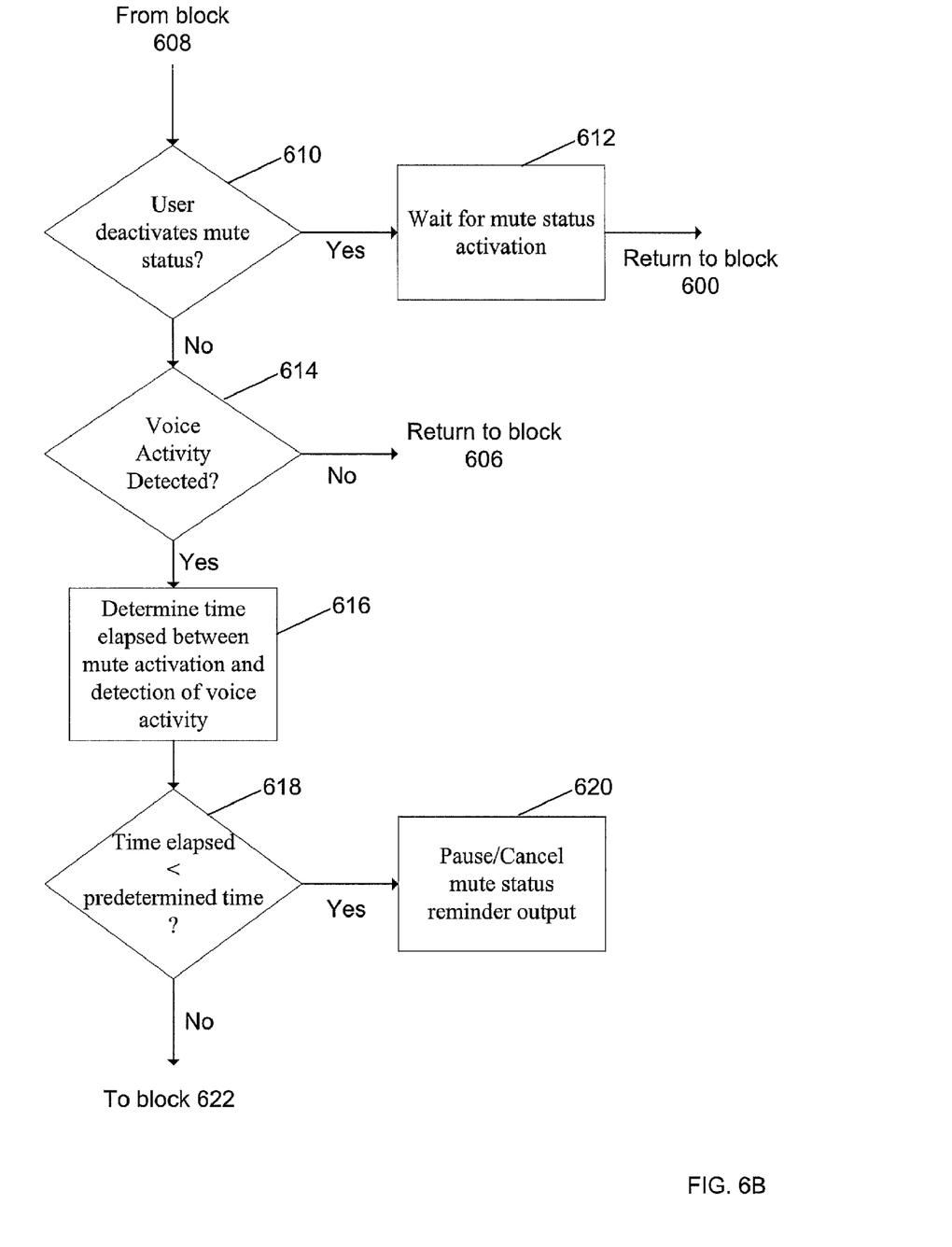
Figure 6C:
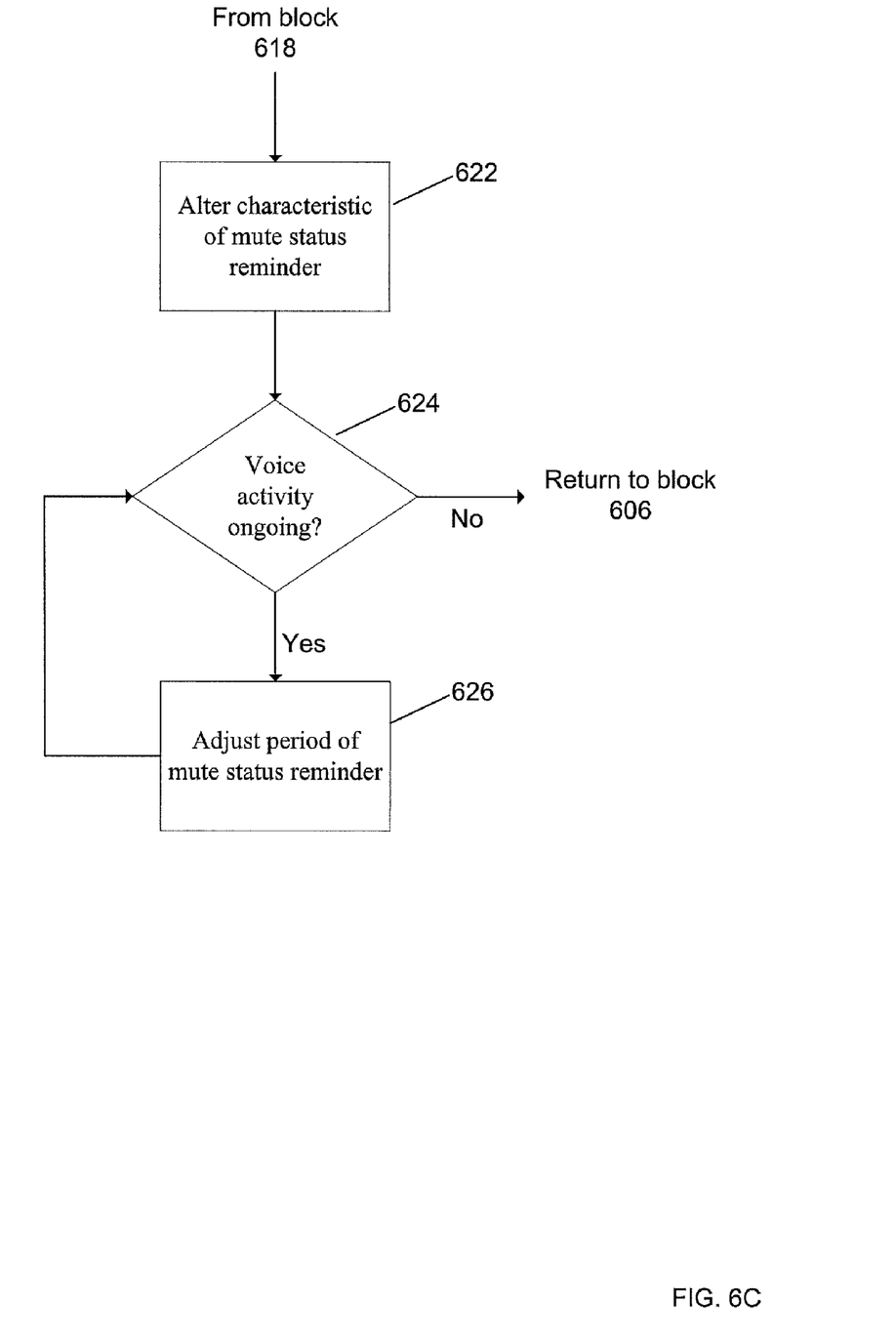

FIGS. 6A-6C are a flow diagram illustrating a process for providing a mute status reminder in a further example. At block 600, a mute activation signal is received. At block 602, a mute status is activated. At block 604, a periodic mute status reminder is output. In one example, the periodic mute status reminder is a series of audible tones. In a further example, the periodic mute status reminder is a series of one or more spoken words. In yet another example, the periodic mute status reminder is both a repeating audible tone and a repeating spoken word or words, where the periodic audible tone is repeated at a first output period and the repeating spoken word is repeated at a second output period. The first output period is less than the second output period in one example. Upon initial mute status activation the periodic mute status reminder is output having an initial mute status activation period.

At block 606, the mute status duration is monitored. At block 608, the period of the mute status reminder is adjusted responsive to the mute status duration. In one example, the period is increased as the mute status duration increases.

At decision block 610, it is determined whether the user deactivates the mute status. If yes at decision block 610, at block 612 the system waits for mute status activation. Following block 612, the process returns to block 600. In this example, the period is reset from an adjusted output period to an initial mute status activation period setting upon deactivation of the mute status and subsequent reactivation of the mute status.

If no at decision block 610, at decision block 614 it is determined whether voice activity is detected. If no at decision block 614, the process returns to block 606. If yes at decision block 614, at block 616 the time elapsed between the mute activation and detection of voice activity is determined.

At decision block 618, is determined whether the time elapsed determined at block 616 is less than a predetermined time. The predetermined period reflects an estimate of the quantity of time within which the user may typically begin speaking after activation of the mute status in a use scenario in which the user desires to conduct a sidebar conversation. In one example, the predetermined time may be in the range of less than five seconds.

If yes at decision block 618, at block 620 the mute status reminder output is paused or canceled. If no at decision block 618, at block 622 a characteristic of the mute status reminder is optionally altered upon detecting the voice activity. The altered characteristic may be an audible characteristic such as volume level or pitch. Alternatively or in addition to, at block 622 the mute status reminder output period is reset to the initial mute status activation period. At decision block 624, it is determined whether detected voice activity is ongoing. If no at decision block 624, the process returns to block 606. If yes at decision block 624, the period of the mute status reminder is further adjusted during the period of ongoing voice activity. For example, during continuous speech, the output period may be increased to reflect a decreased reminder need. Following block 626, the process returns to decision block 624.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of communication devices used by the call participants, type and characteristics of the outputted mute status reminder, user interface input mechanisms to control mute status activation or deactivation operation at the communication device, and the type of the communication network used by the communication devices. For example, the communications network used may be a PSTN, a public or private data network, wireline or wireless network, or the Internet. Furthermore, the functionality associated with any blocks described above may be centralized or distributed. It is also understood that one or more blocks of the invention may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A communication apparatus comprising:
   a mute activation/deactivation control user interface;
   a timer adapted to monitor a mute status duration upon activation of a mute status;
   a mute status reminder module adapted to output a periodic mute reminder having an adjustable output period between each mute reminder, the mute status reminder module further adapted to adjust the adjustable output period responsive to the mute status duration.

2. The communication apparatus of claim 1, wherein the periodic mute reminder having an adjustable output period comprises a repeating audible tone having a first period and outputting a repeating spoken word having a second period, the first period less than the second period.

3. The communication apparatus of claim 1, wherein the output period is increased as a function of increasing mute status duration.

4. The communication apparatus of claim 1, further comprising a voice activity detector to detect a voice activity, wherein the mute status reminder module is further adapted to immediately output a mute status reminder having a modified characteristic upon detecting the voice activity.

5. The communication apparatus of claim 4, wherein the mute status reminder having a modified characteristic comprises a mute status reminder having an increased volume level or altered pitch.

6. The communication apparatus of claim 1, further comprising a voice activity detector to detect a voice activity, the mute status reminder module adapted to determine an elapsed time between activation of the mute status and detecting the voice activity, wherein the mute status reminder module is adapted to pause or cancel the periodic mute reminder if the elapsed time is less than a pre-determined elapsed time.

7. The communication apparatus of claim 1, further comprising a voice activity detector to detect a period of ongoing voice activity subsequent to activation of the mute status, wherein the mute status reminder module is further adapted to adjust the adjustable output period during the period of ongoing voice activity.

8. A method for providing a mute status reminder comprising:
   monitoring a mute status duration upon activation of a mute status at a communication device;
   outputting a periodic mute reminder having an output period between each mute reminder responsive to activation of the mute status; and
   adjusting the output period responsive to the mute status duration.

9. The method of claim 8, wherein adjusting the output period comprises increasing the output period as a function of increasing mute status duration.

10. The method of claim 8, further comprising resetting the output period from an adjusted output period to an initial mute status activation period setting upon deactivation of the mute status and subsequent reactivation of the mute status.

11. The method of claim 8, wherein outputting a periodic mute reminder having an output period between each mute reminder comprises outputting a repeating audible tone having a first period between each audible tone and outputting a repeating spoken word having a second period between each spoken word, the first period less than the second period.

12. The method of claim 8, further comprising:
   detecting a voice activity subsequent to activation of the mute status; and
   immediately outputting a mute status reminder having a modified characteristic upon detecting the voice activity.

13. The method of claim 12, wherein immediately outputting a mute status reminder having a modified characteristic comprises outputting a mute status reminder having an increased volume level or altered pitch.

14. The method of claim 12 further comprising resetting the output period from an adjusted output period to an initial mute status activation period setting upon detecting the voice activity.

15. The method of claim 8, further comprising:
   determining an elapsed time between activation of the mute status and detecting a voice activity;
   pausing or cancelling outputting the periodic mute reminder if the elapsed time is less than a pre-determined elapsed time.

16. The method of claim 8, further comprising:
   detecting a period of ongoing voice activity subsequent to activation of the mute status; and
   adjusting the output period between each mute reminder during the period of ongoing voice activity.

17. A computer readable storage medium storing instructions that when executed by a computer cause the computer to perform a method for providing a mute status reminder comprising:
   monitoring a mute status duration upon activation of a mute status;
   outputting a periodic mute reminder having an output period between each mute reminder responsive to activation of the mute status; and
   adjusting the output period responsive to the mute status duration.

18. The computer readable storage medium of claim 17, wherein adjusting the output period comprises increasing the output period as a function of increasing mute status duration.

19. The computer readable storage medium of claim 17, further comprising resetting the output period from an adjusted output period to an initial mute status activation period setting upon deactivation of the mute status and subsequent reactivation of the mute status.

20. The computer readable storage medium of claim 17, wherein outputting a periodic mute reminder having an output period between each mute reminder comprises outputting a repeating audible tone having a first period between each audible tone and outputting a repeating spoken word having a second period between each spoken word, the first period less than the second period.

21. The computer readable storage medium of claim 17, the method further comprising:
   determining an elapsed time between activation of the mute status and detecting a voice activity;
   pausing or cancelling outputting the periodic mute reminder if the elapsed time is less than a pre-determined elapsed time.

22. The computer readable storage medium of claim 21, the method further comprising outputting a mute status reminder having a modified audible characteristic upon detecting the voice activity if the elapsed time is greater than the pre-determined elapsed time.

23. The computer readable storage medium of claim 22, wherein outputting a mute status reminder having a modified audible characteristic comprises outputting a mute status reminder having an increased volume level or altered pitch.

24. The computer readable storage medium of claim 22, the method further comprising resetting the output period from an adjusted output period to an initial mute status activation period setting upon detecting the voice activity.

25. The computer readable storage medium of claim 17, the method further comprising:
   detecting a period of ongoing voice activity subsequent to activation of the mute status; and
   adjusting the output period between each mute reminder during the period of ongoing voice activity.

* * * * *